Patented July 12, 1932

1,867,050

UNITED STATES PATENT OFFICE

GERHARD BALLE AND KARL OST, OF FRANKFORT-ON-MAIN-HOCHST, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CELLULOSE ETHERS AND PROCESS OF PREPARING THEM

No Drawing. Application filed February 6, 1929, Serial No. 338,029, and in Germany February 10, 1928.

The present invention relates to cellulose ethers and process of preparing them.

When preparing cellulose ethers it has been found that these ethers which contain 1½ to 2½ mols of alkyl per weight of $C_6H_{10}O_5$ unit of the cellulose molecule are most appropriate for technical purposes inasmuch as they possess by far the best mechanical properties. They have, however, at the same time and the disadvantage that they are, especially the ethers of the initial members of the aliphatic series, rather unstable towards water, particularly at low temperatures, so much that they cannot be used for many purposes.

If, on the other hand, ethers are prepared by alkylating cellulose to a higher degree so that they contain more than 2½ mols of alkyl per weight of $C_6H_{10}O_5$ unit of the cellulose molecule, there are obtained products, which although stable towards water, are much inferior as to the strength, for instance, of films prepared therefrom to the ethers containing from 1½ to 2½ mols of alkyl per weight of $C_6H_{10}O_5$ unit of the cellulose molecule.

We have now found that alkyl celluloses containing about 1½ to 2½ mols of alkyl per weight of $C_6H_{10}O_5$ unit of the cellulose molecule can be prepared entirely waterproof, while maintaining the specially favorable mechanical properties of this class of ethers, if there are used up to 2 mols of aralkyl halide for every 10-30 mols of alkyl halide in the preparation of the cellulose ethers from metal compounds of the cellulose and alkyl halides.

This mixture may be caused to act upon a suitable alkali cellulose or other metal compound of cellulose not only in its liquid but also in its gaseous phase.

In the pertaining literature are described so-called mixed ethers of cellulose, i. e. such ethers which contain for instance, besides ethyl groups, also benzyl groups; however, these mixed ethers which contain approximately the same amount of ethyl and benzyl or only significant quantities of benzyl, do not possess the excellent mechanical properties referred to above.

The products described in the present specification cannot be regarded as mixed ethers in the ordinary sense of the term, because the aralkyl halide is used in the new process only in a perfectly subordinate manner and nevertheless, the instability towards water of the cellulose ethers containing about 1½ to 2½ mols of alkyl per weight of $C_6H_{10}O_5$ unit of the cellulose molecule is completely remedied without impairing the excellent mechanical properties of this product.

The following examples illustrate our invention but they are not intended to limit it thereto, the parts being by weight:

1. 960 parts of lignocellulose in the form of pasteboard are soaked for 2 hours in a caustic soda solution of 50 per cent strength at a temperature of 30° C., then pressed until the content of alkali amounts to 3-6 mols per weight of $C_6H_{10}O_5$ unit of the cellulose molecule, the mass is then disintegrated into fibers and left to ripen for a short time at a temperature of 20° C. The sodium cellulose thus obtained is heated for 6-7 hours in a pressure vessel containing a mixture of 5460 parts of ethyl chloride and 762 parts of benzyl chloride (that is, per weight of $C_6H_{10}O_5$ unit of the cellulose molecule there are used 14 mols of ethyl chloride and 1 mol of benzyl chloride) at a temperature between 110° C. and 120° C. The pressure of the mixture of the alkylating agents during the alkylation corresponds to the said temperature. The excess of ethyl chloride having been eliminated, the reaction product is freed from the excess of alkali and sodium chloride by washing it with water and then freed from the excess of benzyl chloride which may be present by means of suitable organic solvents whereupon the reaction product is dried.

The product thus obtained gives a clear solution in a mixture of alcohol and benzene in the proportion of 1:1 and is perfectly stable towards water, even towards ice water.

2. 960 parts of cotton linters in the form of paper or pasteboard or soaked for 2 hours in caustic soda solution of 55 per cent strength at a temperature of between 40° C. and 45° C. while using a vacuum, then pressed until the weight amounts to 2700 parts and disintegrated into fibres. After having been allowed to ripen for a more or less long time the sodium cellulose is alkylated for about 3-4 hours in a pressure vessel at a temperature of between 70° C. and 80° C. together with 6000 parts of methyl chloride and 1500 parts of benzyl chloride.

The excess of the alkylating agents having been removed, the product is washed with water until it becomes free from salt and shows a neutral reaction. The product thus obtained is a methyl-benzyl-cellulose which is nearly insoluble in water.

3. 960 parts of lignocellulose in the form of pasteboard are soaked for 2 hours at a temperature of between 45° C. and 55° C. in caustic soda solution of 60 per cent strength, then pressed until the weight amounts to about 2500-2600 parts and disintegrated into fibers. The product is then allowed to ripen at a temperature of about 20° C.-22° C. for a more or less long time, and alkylated for 4 hours while stirring, in a pressure vessel at a temperature of between 110° C. and 120° C. with a mixture of 5500 parts of ethyl chloride and 1200 parts of benzyl chloride.

The product is worked up as described in Example 1; the ethyl-benzyl-cellulose ether thus produced gives a clear solution in alcohol-benzene 1:1 and is completely stable towards water.

We claim:

1. In a process of preparing cellulose ethers by acting upon alkali metal compounds of the cellulose by means of alkylating agents, the step which comprises causing a mixture of alkyl halide and aralkyl halide to act upon the cellulose metal compounds, said mixture containing 10 to 30 mols of alkyl halide and up to 2 mols of aralkyl halide per weight of a $C_6H_{10}O_5$ unit of the cellulose molecule, at a temperature of between 100° C. and 120° C. and a pressure of between 15 and 20 atmospheres.

2. In the process of preparing cellulose ethers by acting upon alkali metal compounds of the cellulose by means of ethylating agents, the step which comprises causing a mixture of ethyl halide and aralkyl halide to act upon the cellulose alkali compounds, said mixture containing 10 to 30 mols of ethyl halide and up to 2 mols of aralkyl halide per weight of a $C_6H_{10}O_5$ unit of the cellulose molecule, at a temperature of between 100° C. and 120° C. and a pressure of between 15 and 20 atmospheres.

3. In the process of preparing cellulose ethers by acting upon sodium compounds of the cellulose by means of ethylating agents, the step which comprises causing a mixture of ethyl halide and benzyl chloride to act upon the cellulose sodium compounds, said mixture containing 10 to 30 mols of ethyl halide and up to 2 mols of benzyl chloride per weight of a $C_6H_{10}O_5$ unit of the cellulose molecule, at a temperature of between 100° C. and 120° C. and a pressure of between 15 and 20 atmospheres.

4. In the process of preparing cellulose ethyl-benzyl-ether by acting upon sodium cellulose by means of ethyl chloride, the step which comprises causing a mixture of ethyl chloride and benzyl chloride to act upon the sodium cellulose, said mixture containing 10 to 30 mols of ethyl chloride and up to 2 mols of benzyl chloride per weight of a $C_6H_{10}O_5$ unit of the cellulose molecule, at a temperature of between 100° C. and 120° C. and a pressure of between 15 and 20 atmospheres.

5. In the process of preparing cellulose ethyl-benzyl-ether by acting upon sodium cellulose by means of ethyl chloride, the step which comprises causing a mixture of ethyl chloride and benzyl chloride to act upon the sodium cellulose, said mixture containing 15 mols of ethyl chloride and 1 mol of benzyl chloride per weight of a $C_6H_{10}O_5$ unit of the cellulose molecule, at a temperature of between 100° C. and 120° C. and a pressure of between 15 and 20 atmospheres.

6. As new products, cellulose ethers which are waterproof containing per $C_6H_{10}O_5$ unit of the cellulose less than 1 aralkyl radicle and sufficient alkyl radicles that the hydrogen atoms of 1½ to 2½ hydroxyl groups per $C_6H_{10}O_5$ unit of the cellulose are replaced by alkyl radicles.

7. As a new product, a cellulose ethyl-benzyl-ether which is waterproof, containing per $C_6H_{10}O_5$ unit of the cellulose less than 1 benzyl radicle and sufficient ethyl radicles that the hydrogen atoms of 1½ to 2½ hydroxyl groups are replaced by ethyl and benzyl radicles.

In testimony whereof, we affix our signatures.

GERHARD BALLE.
KARL OST.